US012762962B2

(12) United States Patent
Bonamy et al.

(10) Patent No.: US 12,762,962 B2
(45) Date of Patent: Oct. 13, 2026

(54) FLIGHT MANAGEMENT SYSTEM OF AN AIRCRAFT

(71) Applicant: THALES, Meudon (FR)

(72) Inventors: Frédéric Bonamy, Toulouse (FR); Baptiste Idiart, Toulouse (FR); Baptiste Lefevre, Toulouse (FR); François Michel, Toulouse (FR); Olivier Soussiel, Toulouse (FR)

(73) Assignee: THALES, Meudon (FR)

( * ) Notice: Subject to any disclaimer, the term of this patent is extended or adjusted under 35 U.S.C. 154(b) by 59 days.

(21) Appl. No.: 18/677,005

(22) Filed: May 29, 2024

(65) Prior Publication Data

US 2025/0014468 A1 Jan. 9, 2025

(30) Foreign Application Priority Data

Jul. 4, 2023 (FR) ...................................... 2307099

(51) Int. Cl.
*G08G 5/34* (2025.01)
*G06N 3/02* (2006.01)

(52) U.S. Cl.
CPC ................ *G08G 5/34* (2025.01); *G06N 3/02* (2013.01)

(58) Field of Classification Search
CPC .. G08G 5/34; G08G 5/21; G08G 5/32; G06N 3/02; G01C 21/20
USPC .......................................................... 701/528
See application file for complete search history.

(56) References Cited

U.S. PATENT DOCUMENTS

| | | | | |
|---|---|---|---|---|
| 7,895,071 B2 * | 2/2011 | Khosla | G06Q 10/06312 705/7.12 |
| 10,295,349 B2 | 5/2019 | Mere | |
| 2010/0191458 A1 | 7/2010 | Baker et al. | |
| 2019/0311634 A1 * | 10/2019 | Lax | G08G 5/55 |

FOREIGN PATENT DOCUMENTS

| | | |
|---|---|---|
| EP | 2 975 361 A1 | 1/2016 |
| EP | 3 534 120 A1 | 9/2019 |
| FR | 3 019 912 A1 | 10/2015 |
| FR | 3 025 919 A1 | 3/2016 |
| FR | 3 029 619 A1 | 6/2016 |

* cited by examiner

*Primary Examiner* — Isaac G Smith
(74) *Attorney, Agent, or Firm* — BakerHostetler

(57) ABSTRACT

A flight management system of an aircraft includes a first non-critical or open world module for creating an enhanced enriched flight plan, the first module being configured to create the enhanced enriched flight plan iteratively by the following steps: initialisation of pseudo-constraints; and iterative enhancement of the choice of pseudo-constraints, until an objective of enhancement or of absence of enhancement with respect to the last best choice of pseudo-constraints is reached, based on at least one optimisation criterion and on at least one parameter representative of the environment of the flight of the aircraft; the second critical or flight management avionics module certified to calculate a path, comprising at least one critical computer and/or at least one critical piece of software for calculating and delivering as output a secured path, based on the enhanced enriched flight plan supplied by the first module.

8 Claims, 2 Drawing Sheets

In this figure, the constraints and pseudo-constraints are illustrated by an example of waypoints. The constraints are the points denoted A and B, the pseudo-constraints are the points denoted C and D. The flight plan is composed of the points A, B, C and D. The path links these points. The wind information is external information, which is not considered as a constraint or a pseudo-constraint.

<u>Initialisation:</u> the reference flight plan is composed of the points A and B. If this flight plan is inserted as such into the FMS, the path generated is the path below.

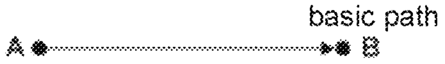

The open world optimisation module MO has additional information available, such as the wind for example.

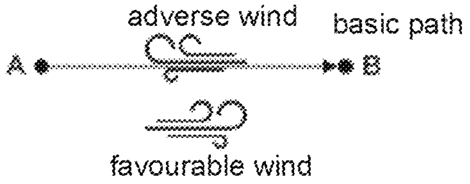

In this example, the optimal path would be rather the path below, which minimises the fuel consumption.

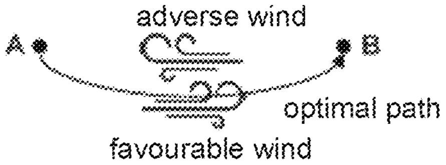

Pseudo-constraints (points C and D) are added randomly or by using an optimisation algorithm of the state-of-the-art, and an assessment is made as to whether they enhance the optimal nature of the path calculated by the FMS. If yes, the pseudo-constraint is kept, otherwise a new configuration is tested.

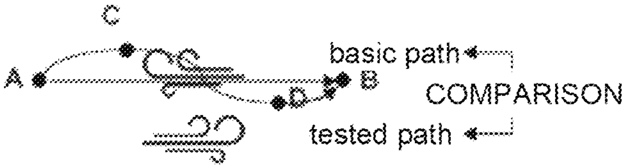

At the end of this iterative process, the added pseudo-constraints (points C and D) constitute, with the initial constraints (points A and B), a flight plan (points A, C, D and B) which allows the FMS to generate an optimal path.

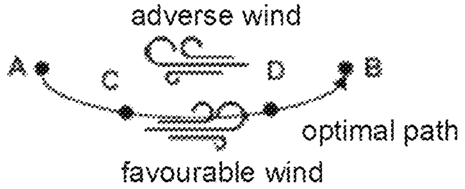

FIG.2

FLIGHT MANAGEMENT SYSTEM OF AN AIRCRAFT

CROSS-REFERENCE TO RELATED APPLICATION

This application claims priority to foreign French patent application No. FR 2307099, filed on Jul. 4, 2023, the disclosure of which is incorporated by reference in its entirety.

FIELD OF THE INVENTION

The present invention relates to a flight management system of an aircraft.

The invention relates to the field of the embedded systems, and more particularly the optimisation of the path of an aircraft.

BACKGROUND

In the context of the present invention, the avionics systems are secured embedded systems that address regulatory constraints of integrity and availability. These avionics systems are characterised by a level of criticality, linked to the level of integrity and to the level of availability, imposed by the regulatory standards currently in force.

Integrity is understood to mean the ability of a system to accomplish a required function correctly. Availability is understood to mean the ability of a system to accomplish a required function in given conditions, at a given instant or during a given time interval. "Non-avionics" or "open world" systems are understood to be systems which are not embedded and/or which do not meet the same regulatory constraints of integrity and of availability.

The levels of criticality are for example defined in the standards RTCA DO178-C and EUROCAE ED-12C, by five levels of criticality (from A to E) defined as follows:

Level A: a fault of the system or subsystem being studied can provoke a catastrophic problem-flight safety or compromised landing-aeroplane crash.

Level B: a fault of the system or subsystem being studied can provoke a dangerous problem leading to serious damage or even the death of some occupants.

Level C: a fault of the system or subsystem being studied can provoke a major problem leading to a malfunctioning of the vital equipment of the aeroplane.

Level D: a fault of the system or subsystem being studied can provoke a minor problem with no effect on the safety of the flight.

Level E: a fault of the system or subsystem being studied can provoke a problem with no effect on flight safety.

These 5 levels are also called design assurance levels (DALs). The levels are established by dependability studies. These studies then set the DAL for the hardware and the software in accordance with the safety standards (Eurocae ED-79 and SAE ARP4754 "Certification Considerations for Highly-Integrated Or Complex Aircraft Systems") or guidelines of the aircraft constructor (ABD100, ABD200, etc.). The DAL of a subsystem can be different from the system level provided that the DAL of the system is reached by a suitable hardware/software architecture.

The invention can be applied in the field of air transport, whether it be line aviation, business aviation, air travel, remote-piloted aircraft or autonomous aircraft.

Currently, in an embedded flight management system (FMS) of an aircraft, one of the most complex functions is the calculation of the path and of the predictions (fuel, performance levels, time of arrival), based on the flight plan of the aircraft. This function is complex because it manages the optimisation of the flight and of multiple constraints. The processing operations require great computation capability of the processor or central processing unit (CPU), and a specific real-time architecture.

Currently the function of calculation of the path and of the predictions is entirely implemented on certified avionics systems. The steps of calculation of this function are as follows:

Creation of the flight plan,

Calculation of the path, and

Guidance along the path.

There are many patent documents concerning flight management systems, some of which relate to a link between the critical avionics domain and less critical domains (i.e. less critical avionics or non-avionics, also called open world).

The document U.S. Pat. No. 10,295,349 B2 is for example known which relates to a flight management system for aircraft which secures data supplied by the non-avionics or open world domain. This document is based on an architecture with two flight management systems, one validating the non-critical data of the open world, while the other continues conducting the flight. This system necessitates the operation of two flight management systems in parallel, which is costly in terms of resources and financially.

The traditional approach consisting in optimising the path in the critical certified avionics generates increasingly heavy costs, which are not economically viable.

Also known is the document FR3019912 which relates to a system and a method for determining flight parameters and fuel consumption of at least one flight phase of an aeroplane. This document relates to a solution for optimising the flight in the open world.

Also known is the document US20100191458 which relates to a system and a method for optimising a flight plan in the open world.

The existing solutions do not make any narrow link between avionics and open world: an optimised flight plan is calculated in the open world, then the flight management system calculates a path following this optimised flight plan. However, the optimisation done in the open world does not take account of the characteristics of the flight management system employed.

Furthermore, whatever the level of optimisation produced on the flight plan in the open world, the degree of optimisation of the path is limited by the capabilities of the flight management system employed.

Additionally, the optimisation methods in the open world do not take into account known defects of the flight management systems in terms of optimisation.

SUMMARY OF THE INVENTION

One aim of the invention is to address the problems cited previously, and notably to increase the accuracy of the calculations for optimising the flight of an aircraft in a domain where the operational performance demands necessitate increasingly complex algorithms based on more and more data, while controlling the development costs which are significant for the production of certified embedded systems.

According to one aspect of the invention, a flight management system of an aircraft is proposed comprising:

a first non-critical or open world module for creating an enhanced enriched flight plan, comprising at least one non-critical computer, and/or at least one non-critical piece of software, for, based on a reference flight plan comprising a first set of constraints, on the value of at least one parameter of a second set of parameters representative of the environment of the flight of the aircraft, and on at least one optimisation criterion of a third set of optimisation criteria, calculating and delivering as output an enhanced enriched flight plan comprising the first set of constraints and at least one pseudo-constraint of a fourth set of pseudo-constraints, intended for a second critical flight management avionics module, for which the enriched flight plan is specifically optimised, the first module being configured to emulate the second critical module and to create the enhanced enriched flight plan iteratively by the following steps:

initialisation of pseudo-constraints of the fourth set;

iterative enhancement of the choice of the pseudo-constraints of the fourth set until an enhancement objective for a path calculated by the second critical flight management avionics module, or the absence of enhancement with respect to the last best choice of pseudo-constraints, is reached, based on at least one optimisation criterion of the third set and on at least one parameter of the second set, the first module being configured to implement the step of iterative enhancement of the choice of the pseudo-constraint or constraints of the fourth set by iteration of the following steps:

calculation and storage of the path that the second module would calculate from a flight plan comprising the constraints of the reference flight plan and the current pseudo-constraints, by emulation of the second critical module;

assessment as to whether the calculated current path is enhanced with respect to the paths calculated in the preceding iterations, as a function of the optimisation criterion or criteria of the third set, of the value of at least one environment parameter of a second set, and of the enhancement objective; and if the objective is reached, exit from the iterative enhancement of the flight plan enriched with the current pseudo-constraints, and otherwise modification of the current pseudo-constraints for the next iteration;

the second critical or flight management avionics module certified for path calculation, comprising at least one critical computer and/or at least one critical piece of software for calculating and delivering as output a secured path, based on the enhanced enriched flight plan supplied by the first module.

In one embodiment, the first module is configured to perform the step of initialisation of pseudo-constraints of the fourth set randomly, or according to a predefined process.

According to one embodiment, the first set of constraints comprises:

points to be flown over;

a lateral path to be followed;

altitudes or ranges of altitudes to be observed;

speeds or ranges of speed to be observed; and schedules to be observed.

According to one embodiment, the second set of parameters representative of the environment of the flight of the aircraft comprises information concerning:

the weather;

air traffic;

the weight and the centring of the aircraft throughout the flight; and/or the thermal and/or electrical energy available on board the aircraft.

In one embodiment, the third set of optimisation criteria comprises:

a minimisation of the travel times; and/or a minimisation of the fuel consumed and of the flight condensation drags; and/or a minimisation of a deviation between a theoretical time of arrival of the flight and a calculated time of arrival (punctuality); and/or a minimisation of the turbulences.

According to one embodiment, the optimisation criterion or criteria is or are selectable by the pilot of the aircraft.

In one embodiment, the fourth set of pseudo-constraints comprises:

points to be flown over;

a lateral path to be followed;

altitudes or ranges of altitudes to be observed;

speeds or ranges of speed to be observed; and schedules to be observed.

In one embodiment, the first module is configured to perform the iterative enhancement by a gradient descent, or a genetic algorithm, or a simulated annealing.

According to another embodiment of the invention, also proposed is an aircraft provided with a flight management system as previously described.

BRIEF DESCRIPTION OF THE DRAWINGS

The invention will be better understood on studying a few embodiments described as nonlimiting examples and illustrated by the attached drawings in which:

FIG. 2 schematically illustrates the operation of the system of FIG. 1, according to an aspect of the invention.

DETAILED DESCRIPTION

Figure 1:
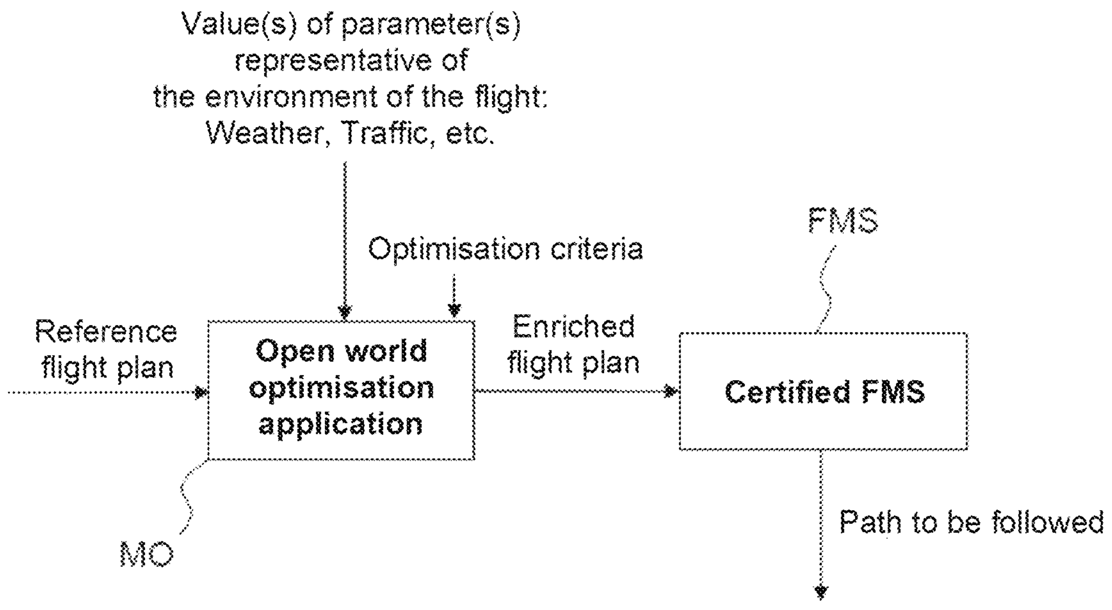
FIG. 1 schematically illustrates a flight management system of an aircraft, according to an aspect of the invention.

FIG. 1 schematically illustrates a flight management system, according to an aspect of the invention.

The flight management system of an aircraft comprises a first non-critical or open world module MO for creating an enhanced enriched flight plan. The first module MO comprises at least one non-critical computer, and at least one non-critical piece of software, and calculates and delivers as output, based on a reference flight plan comprising a first set of constraints, on the value of at least one parameter of a second set of parameters representative of the environment of the flight of the aircraft, and on at least one optimisation criterion of a third set of optimisation criteria, an enhanced enriched flight plan comprising the first set of constraints and at least one pseudo-constraint of a fourth set of pseudo-constraints, intended for a second critical flight management avionics module FMS, for which the enriched flight plan is specifically optimised.

The first module MO is configured to create the enhanced enriched flight plan iteratively by the following steps:

initialisation of pseudo-constraints of the fourth set;

iterative enhancement of the choice of the pseudo-constraints of the fourth set, until an enhancement objective, or absence of enhancement of a path calculated by the second critical flight management avionics module FMS with respect to the last best choice of pseudo-constraints, is reached, based on at least one optimisation criterion of the third set and on at least one parameter of the second set.

The flight management system of an aircraft also comprises the second critical or avionics flight management module FMS certified to calculate a path, comprising at least one critical computer and/or at least one critical piece of software to calculate and deliver as output a secured path, based on the enhanced enriched flight plan supplied by the first module MO.

The first module MO is configured to perform the step of initialisation of pseudo-constraints of the fourth set randomly, or according to a predefined process.

FIG. 2 schematically represents the operation of the flight management system of an aircraft.

The first module MO is configured to implement the step of iterative enhancement of the choice of the pseudo-constraint or constraints of the fourth set by iteration of the following steps:

- calculation and storage of the path that the second module FMS would calculate based on a flight plan comprising the constraints of the reference flight plan and the current pseudo-constraints;
- assessment as to whether the calculated current path is enhanced with respect to the paths calculated in the preceding iterations, as a function of the optimisation criterion or criteria of the third set, on the value of at least one parameter of a second set, and on the enhancement objective; and
- if the objective is reached, exit from the iterative enhancement of the enriched flight plan with the current pseudo-constraints, and otherwise modification of the current pseudo-constraints for the next iteration.

The first set of constraints can comprise:

- points to be flown over;
- a lateral path to be followed;
- altitudes or ranges of altitudes to be observed;
- speeds or ranges of speed to be observed; and
- schedules to be observed.

The second set of parameters representative of the environment of the flight of the aircraft can comprise information concerning:

- the weather (current and forecast);
- air traffic (in-flight and over the airports);
- the weight and the centring of the aeroplane throughout the flight; and/or
- the energy available on board the aircraft (thermal or electrical).

The third set of optimisation criteria can comprise:

- a minimisation of the travel times; and/or
- a minimisation of the fuel consumed and of the flight condensation drags; and/or
- a minimisation of a deviation between a theoretical time of arrival of the flight and a calculated time of arrival (punctuality); and/or
- a minimisation of the turbulences.

The optimisation criterion or criteria can be selectable by the pilot of the aircraft.

The fourth set of pseudo-constraints can comprise:

- points to be flown over;
- a lateral path to be followed;
- altitudes or ranges of altitudes to be observed;
- speeds or ranges of speed to be observed; and
- schedules to be observed.

The first module MO can be configured to perform the iterative enhancement by a gradient descent, or a genetic algorithm, or a simulated annealing.

In a variant, the invention also proposes an aircraft provided with a flight management system as previously described.

The present invention makes it possible to enhance the effectiveness of the augmented FMS, by analysing its operation.

Pseudo-constraints are constraint values for points which are not in the reference flight plan, but in the enriched flight plan.

Based on the reference flight plan, on the enhanced enriched flight plan also called optimal flight plan, on the path calculated by the second module FMS, on the path actually flown, on the data concerning the flight conditions (weather, ATM and AOC communication), and on returns from the pilots, one or more experts can write a new algorithm to create the enriched flight plan, by taking into account all of the data from several flights.

The collection of data makes it possible to download the data from the aircraft to a computation unit on the ground (cloud or other).

The updating is done by a maintenance operator who uploads the new algorithm into the aeroplane.

The analysis can use Artificial Intelligence techniques.

The updating can be performed via a computing network between the aircraft and the computation unit on the ground.

The present invention offers the following advantages:

- Optimisation of the path: this invention maximises the optimisation capability of the second module FMS, by best exploiting its qualities and avoiding its defects.
- Functional augmentation: the first open world module MO can offer functions that do not exist in the certified second module FMS, while making sure to be perfectly compatible with the interfaces of the second module FMS.
- Reduction of the complexity of the certified software: the certified second module FMS can remain relatively simple, unlike the first open world module MO, which concentrates all the algorithmic complexity of optimisation. The reduced complexity of the certified algorithms reduces the number of demands, of lines of code and therefore of tests.
- Reduction of the demands on the hardware: the reduction of the CPU imprint of the certified algorithms, and therefore of the real-time architecture of the software, reduces the power needed for the certified computers, and therefore reduces the costs through the use of old and/or more "lightweight" hardware. For the non-certified calculations, a COTS computer can be employed which allows for a better SWaP (Size, Weight and Power).
- Adaptation to future needs: traditionally, the changes of the second module FMS relate mostly to an enhancement of the optimisation of the paths, and the taking into account of increasingly numerous constraints. Transferring these efforts into the open world allows for a much greater agility in the changes, and facilitates the adaptation to future needs.
- Compatibility with new technologies: the first open world module MO offers the possibility of using techniques that are very difficult to certify such as the use of Artificial Intelligence. Indeed, the final calculation of the path is always performed by the certified FMS and can be verified by the pilot.
- Stability of the certified FMS Core: the functional variability can be borne by the open world application. The certified algorithms of the second module FMS are not impacted by new needs.

The invention claimed is:

1. An aircraft comprising a flight management system, the flight management system comprising:

a first non-critical or open world module (MO) configured and/or operable to create an enhanced enriched flight plan, the first non-critical or open world module (MO) comprising at least one non-critical computer and/or at least one non-critical piece of software, the first non-critical or open world module (MO) configured and/or operable to calculate and deliver an enhanced enriched flight plan based on a reference flight plan comprising a first set of constraints, on a value of at least one parameter of a second set of parameters representative of an environment of a flight of the aircraft, and on at least one optimisation criterion of a third set of optimisation criteria, the first non-critical or open world module (MO) being further configured and/or operable to output the enhanced enriched flight plan comprising the first set of constraints and at least one pseudo-constraint of a fourth set of pseudo-constraints, the first non-critical or open world module (MO) further configured and/or operable to deliver the enhanced enriched flight plan to a second critical flight management avionics module (FMS), for which the enriched flight plan is specifically optimised, the first non-critical or open world module (MO) being configured to emulate the second critical flight management avionics module (FMS) to create the enhanced enriched flight plan iteratively with a configuration implementing the following steps:

initialisation of pseudo-constraints of the fourth set; and iterative enhancement of a choice of the pseudo-constraints of the fourth set, until an objective of enhancement of a path calculated by the second critical flight management avionics module (FMS), or absence of enhancement with respect to a last best choice of pseudo-constraints obtained during one or more preceding iterations of the iterative enhancement, is reached, based on at least one optimization criterion of the third set and on at least one parameter of the second set, the first non-critical or open world module (MO) being configured to implement the step of iterative enhancement of the choice of the pseudo-constraint or constraints of the fourth set by iteration with a configuration implementing the following steps:

calculation and storage of the path that the second critical flight management avionics module (FMS) calculates based on a flight plan comprising the constraints of the reference flight plan and current pseudo-constraints, by emulation of the second critical flight management avionics module (FMS);

assessment as to whether the calculated current path is enhanced with respect to the paths calculated in the one or more preceding iterations of the iterative enhancement, as a function of the optimisation criterion or criteria of the third set, of the value of at least one environment parameter of the second set of parameters, and of the enhancement objective; and if the objective is reached, exit from the iterative enhancement of the enriched flight plan with the current pseudo-constraints, and otherwise modification of the current pseudo-constraints for a next iteration;

the second critical flight management avionics module (FMS) being certified to calculate a path, the second critical flight management avionics module (FMS) comprising at least one critical computer and/or at least one critical piece of software for calculating and delivering as output a secured path, based on the enhanced enriched flight plan provided by the first non-critical or open world module (MO), and aircraft guidance being based on the secured path.

2. The system according to claim 1, wherein the first non-critical or open world module (MO) is configured to perform the step of initialisation of pseudo-constraints of the fourth set randomly, or according to a predefined process.

3. The system according to claim 1, wherein the first set of constraints comprises:

points to be flown over;

a lateral path to be followed;

altitudes or ranges of altitudes to be respected;

speeds or ranges of speed to be respected; and schedules to be respected.

4. The system according to claim 1, wherein the second set of parameters representative of the environment of the flight of the aircraft comprises information concerning:

weather;

air traffic;

a weight and balance of the aircraft throughout the flight; and/or thermal and/or electrical energy available on board the aircraft.

5. The system according to claim 1, wherein the third set of optimisation criteria comprises:

a minimisation of a flight time;

a minimisation of fuel consumed and of flight condensation drags;

a minimisation of a deviation between a theoretical time of arrival of the flight and a calculated time of arrival; and/or a minimisation of turbulences.

6. The system according to claim 1, wherein the optimisation criterion or criteria is or are selectable by a pilot of the aircraft.

7. The system according to claim 1, wherein the fourth set of pseudo-constraints comprises:

points to be flown over;

a lateral path to be followed;

altitudes or ranges of altitudes to be respected;

speeds or ranges of speed to be respected; and schedules to be respected.

8. The system according to claim 1, wherein the first non-critical or open world module (MO) is configured to perform the iterative enhancement by a gradient descent, a genetic algorithm, or a simulated annealing.

* * * * *